United States Patent [19]

Bufler

[11] 4,337,840
[45] Jul. 6, 1982

[54] DRIVING DEVICE FOR AUTOMOBILES, IN PARTICULAR ALL-TERRAIN VEHICLES

[75] Inventor: Ernst Bufler, Wolfsburg, Fed. Rep. of Germany

[73] Assignee: Volkswagenwerk Aktiengesellschaft, Wolfsburg, Fed. Rep. of Germany

[21] Appl. No.: 166,816

[22] Filed: Jul. 8, 1980

[30] Foreign Application Priority Data

Jul. 13, 1979 [DE] Fed. Rep. of Germany ....... 2928351

[51] Int. Cl.³ ............................................. B60K 17/34
[52] U.S. Cl. ...................................... 180/233; 180/23; 180/24.08
[58] Field of Search .................. 180/24.08, 22, 23, 233, 180/245, 246, 247, 248, 249, 250

[56] References Cited

U.S. PATENT DOCUMENTS 1,524,875 2/1925 Martinson ........................... 180/245

FOREIGN PATENT DOCUMENTS 2413288 10/1975 Fed. Rep. of Germany .
2835865 2/1980 Fed. Rep. of Germany .

OTHER PUBLICATIONS

Unusual Features of Army Transfer Case, Automotive Industries, Sep. 1950, pp. 32, 33 and 72.

Primary Examiner—John A. Pekar
Attorney, Agent, or Firm—Brumbaugh, Graves, Donohue & Raymond

[57] ABSTRACT

An all-wheel driving device for all-terrain vehicles employs a conventional differential for the wheels of the rear axle and separate, automatically lockable, freewheel devices for each individual front steerable wheel of the vehicle. As a result, one of the two separate differentials normally used for four-wheel drive vehicles can be eliminated.

4 Claims, 3 Drawing Figures

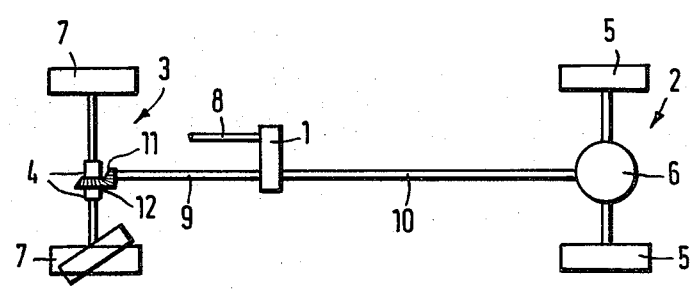
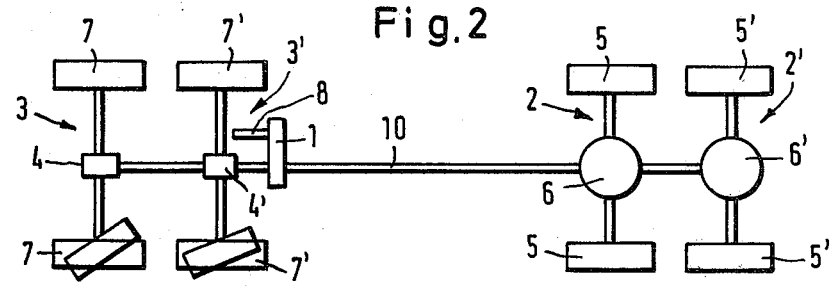
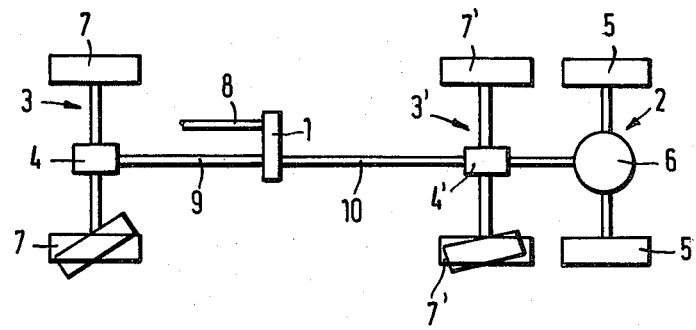

DRIVING DEVICE FOR AUTOMOBILES, IN PARTICULAR ALL-TERRAIN VEHICLES

BACKGROUND OF THE INVENTION

The invention concerns a driving device for automobiles, and more particularly, all-terrain vehicles in which both the front and rear axles are capable of being driven.

In all-wheel driven automobiles of both the passenger automobile and truck types, e.g. four-wheel drive vehicles, an additional center differential between the two driving axles is generally necessary in order to avoid any straining of the drive shafts due to unequal wheel paths, in particular during cornering. Moreover, differential locks are required in general in order to prevent the spinning of individual axles or wheels. These differential locks must be connected manually when needed, in particular during off-the-road driving, but should not be effective during normal road travel conditions. Thus, all-wheel driven vehicles of this kind require not only additional structure and are costly, they can be operated only by expert and specially skilled drivers.

In order to reduce the structural requirements and to render the operation of such all-terrain vehicles easier, driving devices have already been developed (e.g., German Pat. No. 892,275) whereby, in place of the customary center differential, there is provided a transfer case by means of which only one of the drive axles is constantly driven through the interposition of a conventional differential. The other drive axle, in particular the front axle, is usually driven intermittently by the interposition of a freewheel device and another conventional differential, which freewheel device is arranged directly on the transfer case and is automatically lockable. The transmission ratio in the axle drive of the vehicle axle driven by way of the freewheel device is then usually about 2% larger than in the axle drive of the constantly driven vehicle axle. This construction ensures that at normal road conditions only the constantly driven axle, which has no freewheel device, is effective, whereas the drive of the vehicle axle with the freewheel device is connected-in only when one of the wheels of the constantly driven vehicle axle starts to spin. By use of a doubly acting freewheel device, completely automatic switching from two-wheel to four-wheel drive, for example, is obtained in both directions of travel.

While this known driving system is substantially simpler to operate than conventional driving systems because of its automatic connection of the second drive axle, it is still costly from the point of view of the structure needed. In addition to the freewheel device arranged on the transfer case, a conventional differential for the front axle is provided as before, so that in order to achieve a true all-terrain behavior, utilization of a manually actuable, differential lock cannot be dispensed with. Otherwise, under unfavorable conditions it may happen that the wheels of both vehicle axles will spin.

SUMMARY OF THE INVENTION

It is the purpose of the present invention to improve a driving device of the all-wheel drive type, and in particular to design it in such a manner that the cost and structural elements are reduced, while true all-terrain driving properties are achieved.

This purpose is attained in accordance with the invention by (a) using only one differential, which is associated with a constantly driven axle, (b) employing separate, automatically lockable freewheel devices associated with each wheel on the other axle or axles, and (c) adjusting the transmission ratios of the axles with freewheel devices to be sufficiently larger than the ratio for the constantly driven axle, that during cornering no stress is developed between the two axles.

In accordance with the invention a conventional differential axle, constituting a constantly engaged main driving axle, is combined with at least one differential-free thrust axle. The two wheels of the differential-free thrust axle are each provided with their own automatically locking freewheel device which becomes effective in a force-transmitting manner upon the spinning of the wheels of the differential axle and, at the same time in the manner of a differential lock, firmly couples both wheels of these axles.

BRIEF DESCRIPTION OF THE DRAWINGS

The invention will be more readily apparent from the following detailed description of illustrative embodiments thereof as represented in the drawing in which:

FIG. 1 illustrates a four-wheel drive vehicle with two axles equipped according to the present invention, and FIGS. 2 and 3 represent four and three axle vehicles, respectively, equipped similarly to the vehicle of FIG. 1.

DESCRIPTION OF ILLUSTRATIVE EMBODIMENTS

The driving device of the two-axle vehicle shown in FIG. 1 utilizes a driving engine, not shown, which is connected with a conventional transfer case 1 by way of an input shaft 8. Torque from the transfer case is supplied via shafts 9 and 10 leading to the front axle 3, as well as the rear axle 2. In a manner known per se, the rear wheels 5 are connected with the output shaft 10 over a differential 6. The schematically shown front axle drive includes a pinion 11 connected with the front output shaft 9, as well as a ring gear 12 meshing therewith and carrying two freewheel devices 4, one each for the left and right front wheels 7. The transmission ratios in the front and rear axle drives are designed in such a manner that at normal road conditions, i.e., when the four wheels can roll on the road without any obstacles, only the two rear wheels 5 are driven, whereas the front wheels 7 are pushed without any torque being transmitted to them via the front output shaft 9. Only when one or both of the rear wheels 5 start(s) to spin will the freewheel devices 4 associated with the front wheels 7 be automatically locked so that the front drive automatically becomes effective and, in the manner of a lockable differential gear, both front wheels are driven. Thus, no additional manually-operated maneuvering device in the manner of a differential lock is needed for the automatic connection of the front drive. In the case of the rear axle driven via the differential 6, use of a separate differential lock may possibly be advantageous.

In the example, the steerable front axle 3 is driven via the freewheel devices 4. As a matter of principle, it is also possible to drive the steerable front axle via a conventional differential and to connect the nonsteerable rear axle via the aforementioned freewheel devices. However, in any case, care must be taken so that within the entire operating range, no strain will ever be created between the two driven axles. As a result, the gear ratio in the axle driven via the freewheel devices 4 is designed sufficiently larger than the gear ratio in the constantly driven vehicle axle 2 so that at no time during cornering, within the entire possible steering lock range of the steerable vehicle wheels, is there any stress or tension developed between the constantly driven vehicle axle and the axle driven via the freewheel units. Accordingly, it must be taken into account that certain low-steering lock ranges exist in which the steerable wheels travelling the inner curve run slower than the non-steerable wheels. The freewheel driven from the transfer case 1 must thus be set sufficiently slower in order to take this aspect into account. The conditions at the outer-curve wheel are of no interest in this respect because, during cornering, this wheel always rolls faster than the non-steerable wheels.

It has been found that in the case of conventional passenger vehicles, faultless operational behavior may be achieved if the gear ratio of the vehicle axle driven via the freewheel devices is at least 4% larger than that of the constantly driven vehicle axle.

FIGS. 2 and 3 illustrate two further possible applications of the invention. FIG. 2 shows an all-wheel driven, four-axle vehicle. The two non-steerable rear axles 2 and 2' with the wheels 5 and 5' are driven as in FIG. 1 by the rear output shaft 10, in each case via a differential 6 and 6', respectively. The steerable wheels 7 and 7' of the two front axles are, as shown in FIG. 1, driven without the use of differentials, but in each case they are driven via freewheel devices 4 and 4', respectively, associated with the vehicle wheels. It is also possible, e.g., as shown in FIG. 3, to design an all-wheel-driven three-axle vehicle with one front axle and one rear axle as steerable axles, and to drive the wheels 7 and 7' of these steerable axles via freewheel devices 4 and 4', respectively.

While the invention has been particularly shown and described with reference to preferred embodiments thereof, it will be understood by those skilled in the art that various changes in form and details may be made therein without departing from the spirit and scope of the invention. In particular the driving arrangement in accordance with the invention is not limited to a specific axle type. It may be utilized in the case of rigid axles as well as independent wheel suspensions.

I claim:

1. In a driving device for automobiles, for example all-terrain vehicles, wherein the driving engine can simultaneously drive several vehicle axles by way of a transfer case having an input shaft connected to said driving engine and two output shafts, a constant drive is applied to at least one vehicle axle via one of said output shafts and a differential gear, and a drive for at least one additional vehicle axle is directly provided from the other output shaft via at least one freewheel device that is automatically locking and without a differential gear, the improvement characterized in that:

the two output shafts of said transfer case are constantly engaged with said input shaft;

said at least one freewheel device comprises separate, automatically lockable freewheel devices associated with each individual wheel on the axle driven thereby, which individual freewheel devices are effective during both forward and reverse travel; and the transmission ratio in the axle drive of the vehicle axle driven by way of the freewheel devices is designed sufficiently larger than the ratio in the axle drive of the constantly driven vehicle axle that at no time during cornering, within the entire possible steering lock range of the steerable vehicle wheels, does there occur a strain due to the relative drives to the constantly driven vehicle axle and the vehicle axle driven by way of the freewheel devices.

2. A driving device as claimed in claim 1, characterized in that the transmission ratio of the vehicle axle drivable over the freewheel devices is larger by at least 4% than that of the constantly driven vehicle axle.

3. A driving device as claimed in claim 1 characterized in that the differential is provided with a differential lock.

4. A driving device is claimed in claims 1, 2, or 3 characterized in that two freewheel devices are associated with two front steerable wheels of a vehicle and the differential is associated with two rear nonsteerable wheels.

* * * * *